United States Patent Office 3,259,666
Patented July 5, 1966

3,259,666
PREPARATION OF VINYL AROMATIC
COMPOUNDS
Frederick J. Soderquist, Essexville, James L. Amos, Midland, and Harold D. Boyce, Coleman, Mich., assignors to The Dow Chemical Company, Midland, Mich., a corporation of Delaware
No Drawing. Filed Feb. 5, 1962, Ser. No. 171,304
4 Claims. (Cl. 260—669)

This invention concerns an improved method for the preparation of vinyl aromatic compounds. More specifically, the invention concerns an improved method for the catalytic dehydrogenation of nuclear methylated ethylbenzene containing a methyl substituent ortho to the ethyl group.

The generally low heat distortion points of styrene plastics often present a severe limitation to their usefulness. A significantly advantageous increase in these heat distortion points is achieved by employment of nuclear methylated styrene monomer, containing a methyl substituent ortho to the vinyl group, as the monomeric starting material. The resulting polymer illustrates the principle that physical properties of polymeric materials are frequently sensitive to the degree of purity of the monomer employed. In the present case, increasing resistance to heat distortion and increasing isomeric and composition purity are correlative properties, with the highest polymer heat distortion points resulting when all of the nuclear methylated styrene monomer employed contains a methyl substituent ortho to the vinyl group.

Another important advantage of isomeric purity is specifically illustrated when the polymerization of vinyltoluene is considered. In this case the gel formation problem which arises when the meta- and para-vinyltoluene isomers are polymerized, and which gradually becomes more serious when increasing percentages of these isomers are present, is circumvented by the employment of high purity ortho-vinyltoluene monomer.

Purity of product becomes a major consideration in the evaluation of dehydrogenation methods for the preparation of methylated vinylbenzenes from methylated ethylbenzenes, containing a methyl group ortho to the vinyl group and ethyl group, respectively. These specific product isomers and the corresponding feedstock isomers are susceptible to ring-isomerization in contradistinction to those compounds which do not contain a methyl group in the above-identified ortho position. In the preparation of ortho-vinyltoluene, 2,3-dimethyl-1-vinylbenzene, 2,4-dimethyl-1-vinylbenzene and 2,5-dimethyl-1-vinylbenzene, undesirable product isomers result from the dehydrogenation of the corresponding methylethylbenzene isomers and from ring-isomerization of the desired product isomer. The term "undesirable product isomers" will be used in the following discussion to include the meta and para isomers of vinyltoluene and the 3,4-, 3,5- and 4,5-dimethyl-1-vinylbenzene isomers of dimethylvinylbenzene. The methylethylbenzene isomers which yield undesirable product isomers upon dehydrogenation result from isomerization, occurring during passage through the dehydrogenation chamber, of unreacted feedstock which is recycled for reuse as well as from isomeric impurities in the original feedstock material. The formation of undesirable product isomers, in addition to decreasing yields of the desired product, poses an extremely difficult, and economically unfeasible, separation problem due to the small differential in boiling points of the product isomers. The boiling points of the ortho (169.8° C.), meta (171° C.) and para (172° C.) isomers of vinyltoluene illustrate this problem.

A second obstacle to the attainment of high yields of the desired methylvinylbenzene isomers ensues from the propensity for cyclization, during the dehydrogenation reaction, of the 1,2 substituents displayed by both the feedstock and dehydrogenation product when a methyl group is ortho to the ethyl or vinyl group, respectively. Although the cyclization products, such as indane and indene in the case of ortho-ethyltoluene feedstock and ortho-vinyltoluene product, respectively, may be removed with relative ease, minimization of their formation would increase the desired product yield.

Previous methods, known to the art, for preparing methylvinylbenzenes by the catalytic dehydrogenation of methylethylbenzenes generally have a number of detrimental characteristics in common. Besides yielding product isomer impurities a second major disadvantage usually encountered in previously known methods is the frequent necessity for interruption of the production process for the purpose of catalyst regeneration.

An improved method has now been discovered, in accordance with the present invention, whereby nuclear methylated ethylbenzene, containing a methyl substituent ortho to the ethyl group, is catalytically dehydrogenated to yield the corresponding methylvinylbenzene isomer. This improved method is advantageously characterized by high product yield, negligible occurrence of ring-isomerization, relatively minimal cyclization of the 1,2 substituents, and greatly enhanced production economics resulting from the prolonged periods of continuous flow operation possible between catalyst regeneration cycles. The virtual elimination of ring-isomerization during the process of the present invention is especially important since it allows recycling of unreacted feedstock uncontaminated by formation of undesirable feedstock isomers and minimizes formation of undesirable product isomers at the expense of the desired product isomer.

The process of the present invention comprises passing vaporized methylethylbenzene, containing a methyl substituent ortho to the ethyl group, through a dehydrogenation chamber containing an active alumina-vanadium catalyst at a temperature between about 500° and 800° C. and at a space velocity, expressed as grams of feedstock per cubic centimeter of catalyst per hour, of 0.1 to 10. A space velocity of from about 0.2 to 0.5 is preferred. The non-condensable gases, largely hydrogen, are discarded while the remaining effluent is condensed and separated by fractional distillation into product materials and unreacted feedstock, the latter being recycled and subsequently reused in the dehydrogenation process.

A high purity feedstock is most advantageously employed, in order to capitalize on the negligible occurrence of ring-isomerization previously discussed, although isomeric mixtures advantageously containing a major mole percentage of isomer with a methyl group ortho to the ethyl group may be used. The feedstock is vaporized and preferably mixed with an inert diluent, e.g., steam, nitrogen, carbon dioxide, hydrogen, benzene, toluene, xylene or methane, prior to contact with the catalyst, although a diluent is not essential to the process. A steam diluent is preferred and is advantageously utilized in a steam to feedstock weight ratio of from about 2:1 to 4:1. The temperature is preferably maintained between about 580° and 675° C. and the pressure normally employed is substantially atmospheric although temperatures may range from about 500° to 800° C. and pressures may range from subatmospheric to above atmospheric pressures.

The active alumina-vanadium catalyst, prepared in a manner similar to that described in Example 1, below, contains from about 0.5 to 10 weight percent vanadium, calculated as the element. The vanadium employed in the catalyst preparation is in the form of a vanadium oxide or a vanadium salt. No appreciable advantage is gained by the use of a higher vanadium content than 10 weight percent. The catalyst is normally regenerated, after about 20 to 60 hours of continuous use, by passing air and steam through the catalyst at approximately 600° to 700° C. for a period of time necessary to burn off the carbon deposit. This time may vary, depending upon chamber design, feed rate, temperature and similar factors, from 5 to 30 percent of the time of the preceding continuous flow cycle.

The following examples are presented for the purpose of illustration and are not to be interpreted as limiting the invention as defined in the claims.

Example 1

An active alumina-vanadium catalyst was prepared by continuously stirring, at room temperature, 100 grams of 5 to 8 U.S. mesh active alumina with 50 cc. of distilled water containing 14 grams of vanadyl sulfate dihydrate until the solution was completely and uniformly absorbed by the alumina. Spectroscopic analysis of a dried sample showed a vanadium content, calculated as the element, of 3 percent by weight.

Example 2

Liquid ortho-ethyltoluene feedstock and water were separately metered into the top section of a vertical tube dehydrogenation chamber where they were heated to a temperature of from about 300° to 400° C. The vaporized mixture was then passed through 70 cc. of the catalyst of Example 1, in a lower section of the dehydrogenation chamber, which was maintained at a temperature of from about 610° to 675° C. The feedstock analyzed 97.5 percent by weight of the ortho isomer, 1.0 percent meta isomer and 1.5 percent para isomer. The feed rate was equivalent to approximately 21.65 grams of ortho-ethyltoluene (a space velocity equal to about 0.3) and approximately 61.8 grams of steam per hour. The vertical tube dehydrogenation chamber was equipped with a suitable feed-metering device and temperature-control means. The condensable effluent gases were separated by fractional distillation. After 42 hours the continuous flow process was interrupted and the catalyst was regenerated by passing air and steam through the dehydrogenation chamber for 3 hours at 675° C. This dehydrogenation-regeneration cycle was continued until a quantity of 2,552 grams of hydrocarbon was recovered from a mixture of 3,269 grams of ortho-ethyltoluene and 11,040 grams of steam fed through the dehydrogenation chamber during the dehydrogenation cycle. The accumulated hydrocarbon condensate analysis is tabulated in Table I following Example 4. High purity 2,3-dimethyl-1-vinylbenzene, 2,4-dimethyl-1-vinylbenzene and 2,5-dimethyl-1-vinylbenzene is prepared in a procedure similar to that above by replacing the ortho-ethyltoluene feedstock with 2,3-dimethyl-1-ethylbenzene, 2,4-dimethyl-1-ethylbenzene and 2,5-dimethyl-1-ethylbenzene, respectively.

For purposes of comparing the results obtained using the catalyst of Example 1 with those obtained using a similar procedure but a different catalyst, two comparative experiments were conducted.

Example 3

A commercially available active alumina-silica catalyst, containing 31.3 percent by weight silicon, was employed in a process similar to that of Example 2. A preheated mixture of 23.3 grams of the same feedstock and 59.3 grams of steam per hour was passed through 70 cc. of the active alumina-silica catalyst at 600° to 700° C. The continuous flow cycle length was 90 hours. A total of 2,686 grams of ortho-ethyltoluene mixed with 6,825 grams of steam was fed into the dehydrogenation chamber to give a yield of 1,965 grams of hydrocarbon condensate, the analysis of which is reported in Table I following Example 4.

Example 4

A commercially available active alumina-tungstic oxide catalyst, containing 19.8 percent by weight of tungsten, was employed in a process similar to that of Example 2. A preheated mixture of 20.5 grams of the same feedstock and 61.5 grams of steam per hour was passed through 70 cc. of the active alumina-tungstic oxide catalyst at 640° to 670° C. The continuous flow cycle length was 4 hours. A total of 1,667 grams of ortho-ethyltoluene was fed into the dehydrogenation chamber to give a yield of 1,128 grams of hydrocarbon condensate, with an analysis as reported in Table I below.

The two comparative experiments above, when collated with that of Example 2, demonstrate the suppression of ring-isomerization accomplished through use of the alumina-vanadium catalyst.

TABLE I

| | Analysis, Weight Percent | | |
|---|---|---|---|
| | Ex. 2 | Ex. 3 | Ex. 4 |
| Ortho-vinyltoluene | 29.6 | 7.8 | 11.7 |
| Para-vinyltoluene | 0.4 | 3.1 | 0.6 |
| Meta-vinyltoluene | | 11.5 | 5.1 |
| Ortho-ethyltoluene | 59.6 | 28.9 | 52.2 |
| Para-ethyltoluene | 0.4 | 7.8 | 1.8 |
| Meta-ethyltoluene | | 22.2 | 9.6 |
| Indene | 6.9 | | 8.8 |
| Xylenes | 1.5 | 3.3 | 3.3 |
| Toluene | 1.0 | 13.1 | 5.2 |
| Benzene | 0.1 | 0.8 | 0.3 |
| Styrene | 0.3 | 0.6 | 1.2 |
| Ethylbenzene | | 0.7 | |
| Tars | 0.2 | 0.2 | 0.2 |

Table II represents a compilation of data from several experimental runs which followed the general procedure of Example 2, utilizing the various active alumina-vanadium catalysts indicated. Since the unreacted ortho-ethyltoluene is recycled and reused as feedstock, the percent yield reflects the overall efficiency of the process, while the percent conversion effects the efficiency of one pass through the dehydrogenation chamber.

TABLE II

| Experiment | Percent Vanadium by weight (calculated as the element) | Continuous Flow Cycle Length | Feed Rate, gms./hr. | | Temperature | Percent Conversion | Percent Yield |
|---|---|---|---|---|---|---|---|
| | | | Ethyltoluene | Steam | | | |
| 1 | 1.6 | 30 | 20.7 | 61.2 | 618–675 | 26.4 | 60.7 |
| 2 | 2.9 | 32 | 21.4 | 61.8 | 625–675 | 25.9 | 63.3 |
| 3 | 3.5 | 40 | 20.7 | 63.7 | 596–678 | 27.0 | 63.3 |
| 4 | 4.5 | 30 | 21.2 | 62.5 | 625–675 | 27.0 | 62.3 |
| 5 | 6.7 | 20 | 24.7 | 62.2 | 610–682 | 25.0 | 65.0 |
| 6 | 5.0 | 30 | 20.9 | 64.5 | 625–675 | 27.9 | 65.1 |
| 7 | 4.2 | 48 | 20.9 | 63.4 | 620–677 | 29.6 | 68.3 |
| 8 | 3.0 | 38 | 19.7 | 123.7 | 625–675 | 27.8 | 66.4 |

TABLE II—Continued

| Experiment | Analysis, Percent by Weight* | | | | | | | | | | | |
|---|---|---|---|---|---|---|---|---|---|---|---|---|
| | Ortho-vinyltoluene | Para-vinyltoluene | Ortho-ethyltoluene | Para-ethyltoluene | Meta-ethyltoluene | Indene | Indane | Benzene | Toluene | Xylene | Styrene | Others |
| 1 | 27.31 | 0.26 | 59.50 | 0.38 | 1.60 | 7.94 | 0.41 | 0.07 | 0.56 | 1.62 | 0.15 | 0.20 |
| 2 | 26.83 | 0.35 | 62.18 | 0.23 | 1.64 | 6.08 | 0.23 | 0.09 | 0.70 | 1.31 | 0.15 | 0.21 |
| 3 | 27.93 | 0.41 | 60.14 | 0.66 | 1.17 | 6.15 | 0.24 | 0.09 | 0.69 | 1.88 | 0.17 | 0.20 |
| 4 | 27.87 | 0.29 | 59.78 | 0.32 | 1.56 | 7.21 | 0.26 | 0.09 | 0.86 | 1.43 | 0.13 | 0.20 |
| 5 | 25.74 | 0.19 | 65.01 | 0.36 | 2.08 | 3.55 | 0.11 | 1.18 | 0.74 | 1.58 | 0.26 | 0.20 |
| 6 | 28.87 | 0.16 | 60.14 | 0.35 | 1.67 | 5.66 | 0.48 | 0.07 | 0.59 | 1.68 | 0.13 | 0.20 |
| 7 | 30.67 | 0.33 | 59.60 | 0.21 | 0.53 | 5.65 | 0.14 | 0.07 | 0.46 | 2.01 | 0.13 | 0.20 |
| 8 | 28.80 | 0.19 | 61.12 | 0.31 | 1.74 | 5.71 | 0.24 |  | 0.43 | 1.10 | 0.15 | 0.21 |

*No measurable quantity of meta-vinyltoluene was present.

We claim:

1. In a method for the preparation of ortho-vinyltoluene by the catalytic dehydrogenation of ortho-ethyltoluene, the improvement whereby ring-isomerization is inhibited which comprises: passing a vaporized, heated ortho-ethyltoluene feedstock mixed with a steam diluent into contact with an active alumina-vanadium catalyst containing an amount of vanadium, calculated as elemental vanadium, greater than about 0.5 percent by weight, at a temperature of from about 500° to 800° C. and at a space velocity between about 0.1 and 10 grams of feedstock per cubic centimeter of catalyst per hour; recovering condensable effluent gases and separating ortho-vinyltoluene product therefrom.

2. The method of claim 1 wherein the steam diluent is employed in a weight ratio to feedstock of from about 2:1 to 4:1.

3. The method of claim 2 wherein the temperature is maintained at from about 580° to 675° C., the catalyst contains from about 2 to 10 weight percent vanadium, calculated as elemental vanadium, and the space velocity is between 0.2 and 0.5.

4. The method of claim 1 wherein the steam diluent is employed in a weight ratio to feedstock of about 3:1, the active alumina-vanadium catalyst contains about 3 weight percent vanadium, calculated as elemental vanadium, the temperature is maintained at from about 610° to 675° C. and the space velocity is about 0.3.

References Cited by the Examiner

UNITED STATES PATENTS 2,376,709  5/1945  Mattox _____ 260—669
2,385,484  9/1945  Wright _____ 260—680
2,603,610  7/1952  Amos et al. _____ 260—669
2,857,440  10/1958  Amos et al. _____ 260—669

OTHER REFERENCES

Kearby, "Industrial and Engineering Chemistry," vol. 42 (1950), pp. 295–300, complete article; pp. 298 and 299 relied upon.

DELBERT E. GANTZ, *Primary Examiner.*

ALPHONSO D. SULLIVAN, *Examiner.*

J. E. DEMPSEY, C. R. DAVIS, *Assistant Examiners.*